(12) United States Patent
Ozkan et al.

(10) Patent No.: US 11,349,120 B2
(45) Date of Patent: May 31, 2022

(54) NANOCOMPOSITE SILICON ELECTRODE AND METHOD

(71) Applicant: The Regents of the University of California, Oakland, CA (US)

(72) Inventors: Cengiz S. Ozkan, San Diego, CA (US);
Mihrimah Ozkan, San Diego, CA (US); Wei Wang, Newport Beach, CA (US)

(73) Assignee: THE REGENTS OF TEE UNIVERSITY OF CALIFORNIA, Oakland, CA (US)

( * ) Notice: Subject to any disclaimer, the term of this patent is extended or adjusted under 35 U.S.C. 154(b) by 273 days.

(21) Appl. No.: 16/486,265

(22) PCT Filed: Feb. 17, 2018

(86) PCT No.: PCT/US2018/018552
§ 371 (c)(1),
(2) Date: Aug. 15, 2019

(87) PCT Pub. No.: WO2018/152447
PCT Pub. Date: Aug. 23, 2018

(65) Prior Publication Data
US 2019/0379042 A1    Dec. 12, 2019

Related U.S. Application Data

(60) Provisional application No. 62/460,538, filed on Feb. 17, 2017.

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/382* (2013.01); *H01M 4/386* (2013.01); *H01M 4/587* (2013.01);
(Continued)

(58) Field of Classification Search
CPC ...... H01M 4/366; H01M 4/382; H01M 4/386; H01M 4/587; H01M 10/0587; H01M 10/0525
See application file for complete search history.

(56) References Cited

U.S. PATENT DOCUMENTS 5,637,636 A * 6/1997 Cartwright ............... C09C 1/30
524/493
6,579,833 B1 * 6/2003 McNallan ......... C04B 35/62884
508/100

FOREIGN PATENT DOCUMENTS

WO    WO2013078645      *  6/2013
WO    WO-2013078645 A1    6/2013
(Continued)

OTHER PUBLICATIONS

International Application Serial No. PCT/US2018/018552, International Search Report dated Apr. 27, 2018, 2 pgs.
(Continued)

*Primary Examiner* — Jayne L Mershon
(74) *Attorney, Agent, or Firm* — Schwegman Lundberg & Woessner, P.A.

(57) ABSTRACT

A silicon based micro-structured material and methods are shown. In one example, the silicon based micro-structured material includes a carbon coating. In one example, the silicon based micro-structured material is used as an electrode in a battery, such as a lithium ion battery.

9 Claims, 14 Drawing Sheets

(51) Int. Cl.
    *H01M 4/587*     (2010.01)
    *H01M 10/0525*     (2010.01)
    *H01M 4/02*     (2006.01)

(52) U.S. Cl.
    CPC .. *H01M 10/0525* (2013.01); *H01M 2004/021* (2013.01)

(56) References Cited

FOREIGN PATENT DOCUMENTS

| WO | WO2015196092 | * | 12/2015 |
| WO | WO-2015196092 A1 | | 12/2015 |

OTHER PUBLICATIONS

International Application Serial No. PCT/US2018/018552, Written Opinion dated Apr. 27, 2018, 5 pgs.
"International Application Serial No. PCT/US2018/018552, International Preliminary Report on Patentability dated Aug. 29, 2019", 7 pgs.

* cited by examiner

1 μm

NANOCOMPOSITE SILICON ELECTRODE AND METHOD

RELATED APPLICATION

This application is a U.S. National Stage Filing under 35 U.S.C. 371 from International Application No. PCT/US2018/018552, filed on Feb. 17, 2018, and published as WO 2018/152447 A1 on Aug. 23, 2018, which claims priority to U.S. Provisional Patent Application No. 62/460,538, entitled "NANOCOMPOSITE SILICON BATTERY," filed on Feb. 17, 2017, each of which is incorporated herein by reference in its entirety.

TECHNICAL FIELD

This invention relates to silicon based material microstructures and methods. In one example, this invention relates to silicon based anodes for lithium ion batteries.

BACKGROUND

Improved batteries, such as lithium ion batteries are desired. One example of a battery structure that can be improved is an anode structure.

BRIEF DESCRIPTION OF THE DRAWINGS

FIGS. 1A-1F show images and depictions of forming a silicon particle according to an example of the invention.

DETAILED DESCRIPTION

Figure 1D:
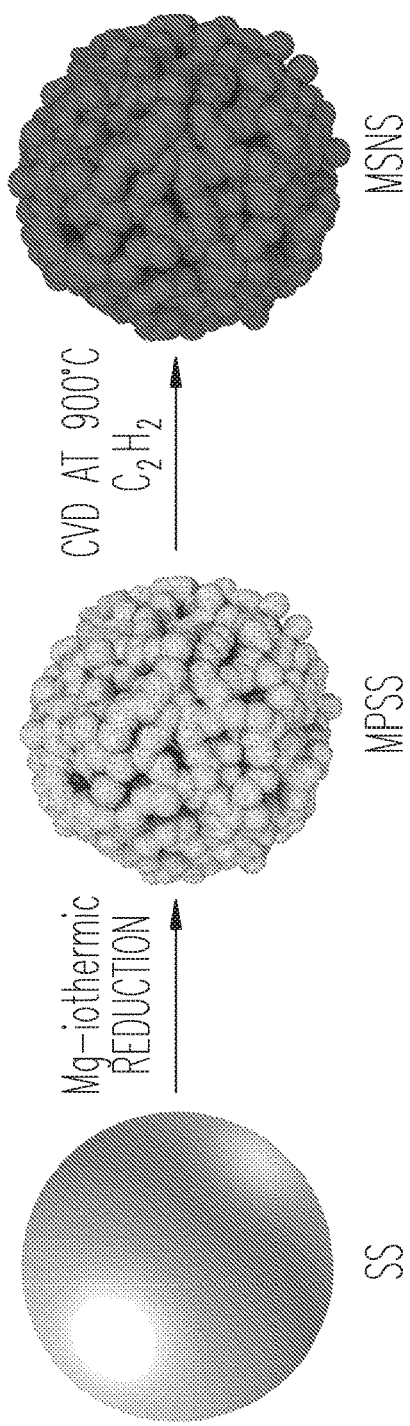
Figure 1D:

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, electrical, or logical changes, etc. may be made without departing from the scope of the present invention.

Herein, facile synthesis of monodisperse silicon and carbon nanocomposite spheres (MSNSs) is achieved via a simple and scalable surface-protected magnesiothermic reduction with subsequent chemical vapor deposition (CVD) process. Li-ion batteries (LIBs) were fabricated to test the utility of MSNSs as an anode material. LIB anodes based on MSNSs demonstrate a high reversible capacity of 3207 mAh $g^{-1}$, superior rate performance, and excellent cycling stability. Furthermore, the performance of full cell LIBs was evaluated by using MSNS anode and a $LiCoO_2$ cathode with practical electrode loadings. The MSNS/$LiCoO_2$ full cell demonstrates high gravimetric energy density in the order of 850 Wh $L^{-1}$ with excellent cycling stability. This work shows a proof of concept of the use of monodisperse Si and C nanocomposite spheres toward practical lithium-ion battery applications.

The increased demand for portable electronics by consumers and professionals alike has not only pushed the limits of electronic devices but also has concurrently increased the energy demand of the devices. From smartphones, tablets and up to electric vehicles and solar farms, the need for high energy rechargeable batteries is greater than ever. Rechargeable Lithium-ion batteries (LIBs) are widely applied in daily applications such as portable electronic devices and low-emission environmental friendly electric vehicles (EVs) because of their relatively high balanced specific energy and power, long cycling stability and low manufacturing cost.

A few extra merits enable lithium-ion battery (LIB) to be an ideal source of energy for commercial portable electronics. Firstly, lithium by nature is the lightest metal, and it has the most electropositivity. Secondly, LIBs demonstrate better safety performance compare with Li metal batteries and it offers a balanced large volumetric energy density (Wh/L) and gravimetric energy density (Wh/kg) simultaneously. However, the enemy density of conventional graphite-based lithium ion battery cells is greatly limited because the stoichiometric limit of $Li^+$ intercalation in $LiC_6$ restricts the theoretical capacitance value of graphite to be about 372 mAh $g^{-1}$ (about 837 mAh $cm^{-3}$).

Although carbon based nanomaterials such as 1D CNT, 2D graphene, and 3D activated and template-derived carbon have lately been found to boost the anode capacity, the anode capacity is still mostly limited to be below 1000 mAh $g^{-1}$. Also, silicon (Si) is considered and has proven to be a more promising anode material due to its highest known theoretical capacity value of 3572 mAh corresponding to the formation of $Li_{15}Si_4$ phase under ambient temperature. However, silicon-based anodes suffer huge volume expansion, upwards of up to 300% during the lithiation process which induces uneven stress-strain distribution within the particle and causes pulverization and loss of active material. To remedy the aforementioned issue of anode pulverization, significant academical and industrial efforts have been made on the synthesis of nano silicon, development of novel binder systems and the design of novel nanostructured Si anode materials.

3D porous Si structures demonstrate stable cycling due to the large electrolyte accessible surface area, shorter Li-ion diffusion length, and high electron conductivity. However, the aforementioned porous nano silicon is mostly produced via etching of Si wafers or other doped Si materials, which require very expensive raw materials and high processing cost. Another detrimental factor that limits the application of porous and nano silicon anodes in full cell applications is its high surface area. The formation and build up of a solid electrolyte interface (SEI) layer on large surface area Si materials consumes lithium, which in turn causes huge irreversible capacity loss.

The synthesis of monodisperse porous silicon nanospheres (MPSSs) is possible via a simple and scalable hydrolysis process with subsequent surface-protected magnesiothermic reduction. The monodisperse and spherical nature of the MPSSs allows for a homogeneous stress-strain distribution within the particle during lithiation and delithiation, which dramatically improves the electrochemical stability. However, like most other porous nano silicon materials, MPSSs may have relatively larger irreversible capacities because of the relatively larger surface area. In addition, the incompatibility of conventional micrometer level carbon black within the MPSS anodes causes the MPSSs have the low reversible capacity and poor coulombic efficiency under high rates (1 C or 2 C).

The addition of a certain amount of carbon nanotubes (CNTs) have been verified to be effective to improve the rate performance and cycling stability without changing the active materials ratio. However, the high cost of CNTs and poor coulombic efficiency of MPSS still limit their application in battery full cells.

In this work, we report an innovative and facile synthesis of monodisperse silicon and carbon nanocomposite spheres (MSNSs) via a simple and scalable surface-protected magnesiothermic reduction process with subsequent chemical vapor deposition. The MSNS has several advantages. (1) The MSNSs still preserve the monodisperse spherical nature which allows a homogeneous stress-strain distribution within the structure during lithiation and delithiation. (2) The MSNS demonstrates much higher (around 25% increase) initial coulombic efficiency of 71.3% (vs. MPSS is 57.25%). (3) Li-ion battery anodes based on MSNSs demonstrate a higher reversible capacity of 3207 mAh $g^{-1}$ compared with previously reported MPSSs anodes, superior rate performance, and enhanced cycling stability under near full utilization of anodes.

Although the term "sphere" is used throughout the present disclosure, one of ordinary skill in the art, having the benefit of the present disclosure, will recognize that any particle will have some degree of non-conformity. In one example, a nanoparticle may be described as a sphere when an appearance is more round than elongated. In one example, a nanoparticle may be described as a sphere when selected diameter dimensions only vary by less than 25 percent from one another. In one example, a nanoparticle may be described as a sphere when selected diameter dimensions only vary by less than 10 percent from one another. In one example, a nanoparticle may be described as a sphere when selected diameter dimensions only vary by less than 5 percent from one another.

As a proof-of-concept for practical LIB applications, full cells with MSNS as anode and lithium cobalt oxide (LiCoO$_2$) as a cathode were fabricated. The MSNS/LiCoO$_2$ full cell is operated between 3.3 and 4.3 V delivers a high reversible capacity of 3.52 mAh cm$^{-2}$, with a measured high energy density on the order of 850 Wh/L with the consideration of both cathodes and anodes. This value can be further boosted by optimizing; the electrode structure and cell balancing. We believe this MSNS design opens new opportunities in high energy density LIBs.

Figure 1C:
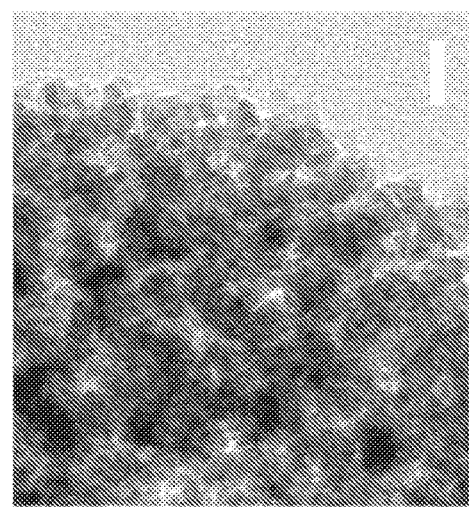
Figure 1B:
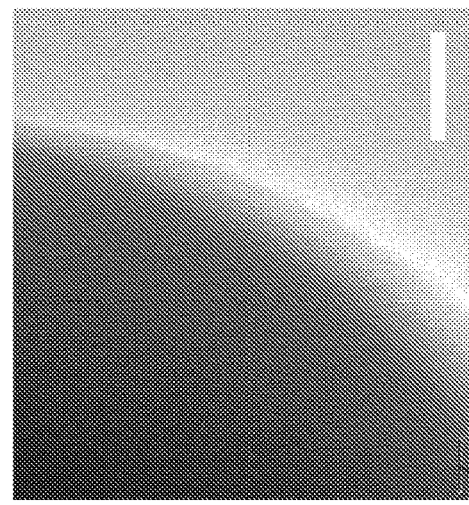

FIG. 1a shows the detailed schematic illustration of the synthesis process of MSNS. The MSNS is obtained via a facile surface-protected magnesiothermic reduction process with subsequent chemical vapor deposition. Firstly, gram-level monodisperse solid silica nanospheres (SSs) were prepared via a modified Stober method (FIG. 1b). The size of the as-synthesized SSs is controllable within the range of 0.05 μm-2 μm. In this work, the size of the starting material (SS) is around 0.2 μm. Adapted the previously proposed idea to preserve the size and shape of the nanospheres, sodium chloride (NaCl) was introduced as a safe, economical and efficient heat scavenger. The local melting of Si and, consequently, aggregation of nano-Si particles can be caused by the magnesiothermic reduction process since it evolves a significant amount of heat. However, by surrounding the as-prepared SSs with the optimum amount of NaCl the fusion of Si can be minimized. The premixed SS, NaCl, and Mg powders are heated up to 700° C. to trigger the reduction, as in Equ. 1.

$$Mg(g)+SiO_2 \leftrightarrows Si(s)+MgO(s) \qquad (1)$$

$$Mg(g)+Si(s) \leftrightarrows Mg_2Si(s) \qquad (2)$$

Figure 1E:
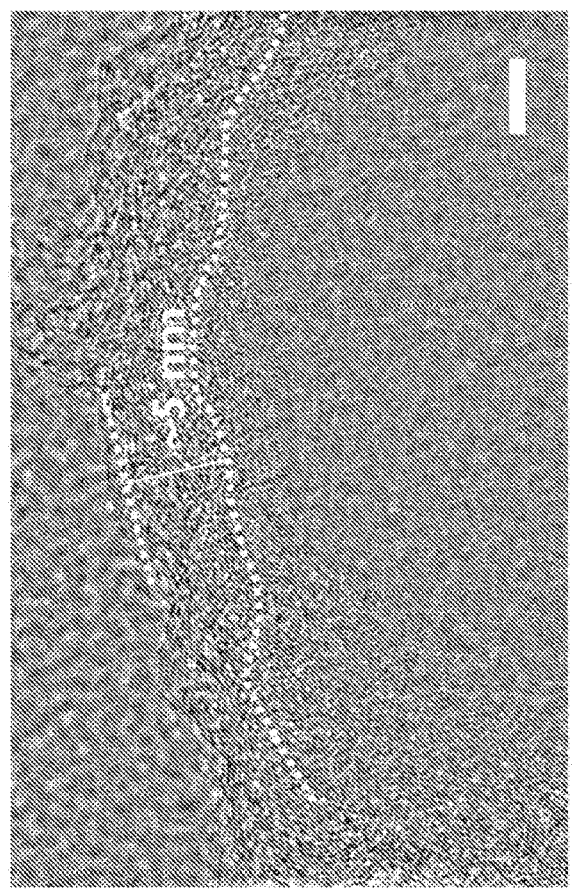
Figure 1F:
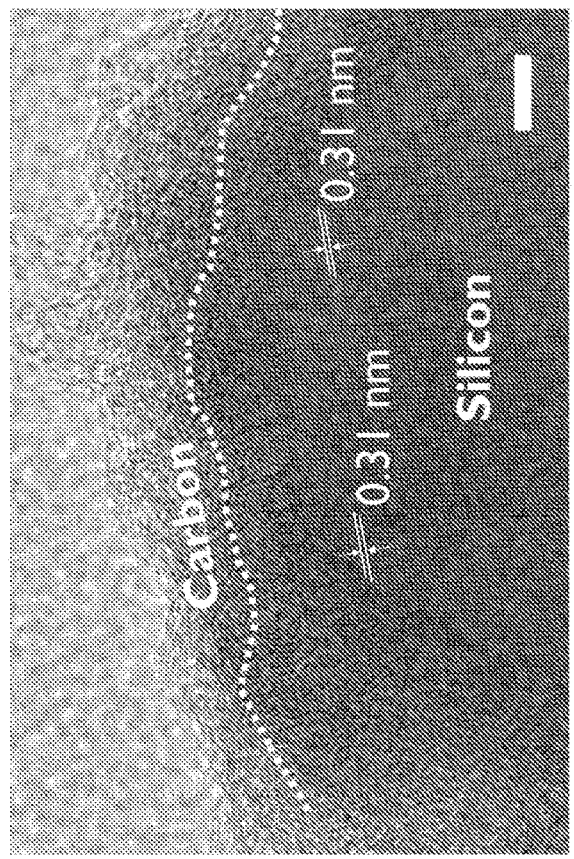
Figure 6A:
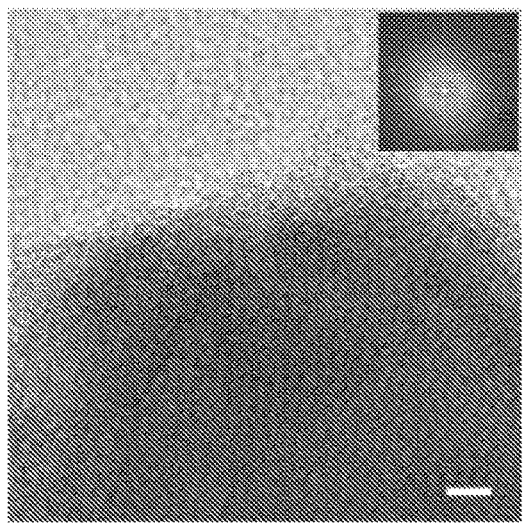
FIGS. 6A-6D show images and data of particles according to an example of the invention.
Figure 6B:
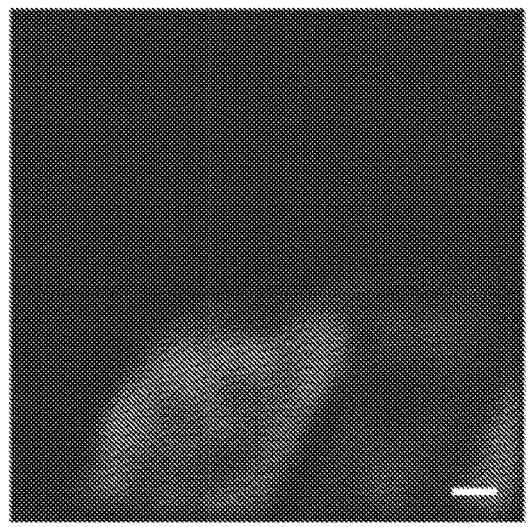
Figure 6C:
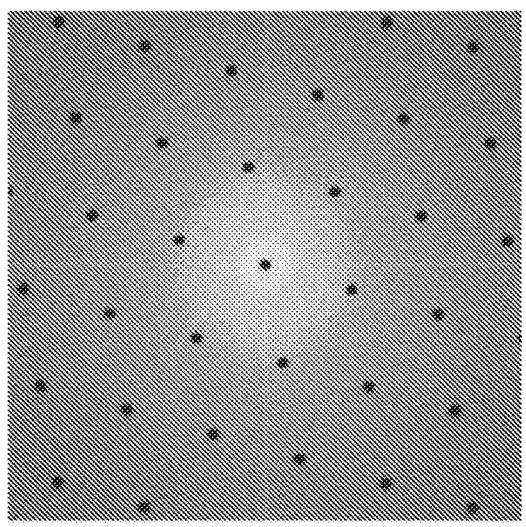
Figure 6D:
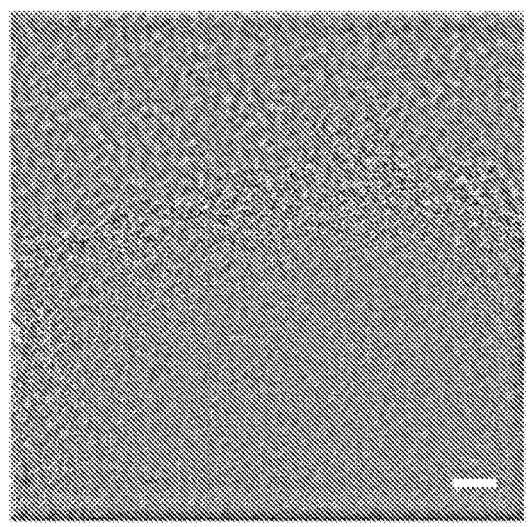
Figure 7A:
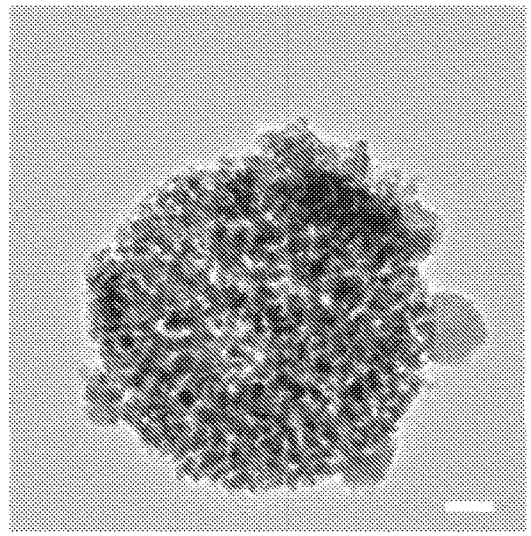
FIGS. 7A-7B show images of particles according to an example of the invention.
Figure 7B:
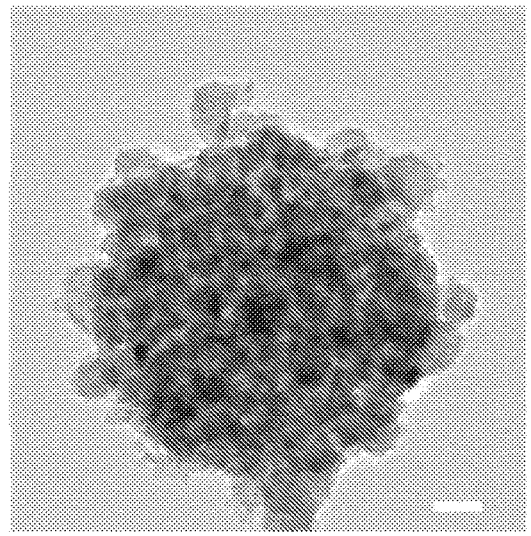
Figure 8:
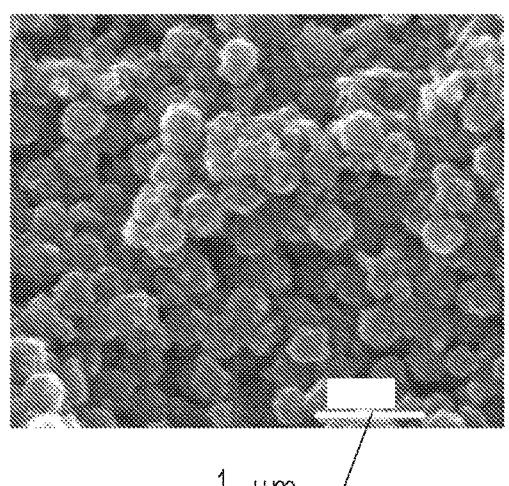
FIG. 8 shows an image of particles according to an example of the invention.

Unwanted product magnesium silicide (Mg$_2$Si) can result from excess Mg alloying with Si, as in Eq. 2. The undesired Mg$_2$Si and excessive NaCl can be simply removed by repeatedly washing with deionized (D.I.) water and HCl acid. Transmission electron microscopy (TEM) micrographs are shown to present the detailed morphology and structural evolution during the synthesis process (FIG. 1b-d). TEM image shows the well-preserved monodisperse nature while also showing the as-synthesized MPSSs are highly porous, with pore diameter in the range of 10-30 nm (FIG. 1c; for details see FIG. 7). Porous silicon nanostructures have been proved to have low stress during lithiation and delithiation, which helps to maintain its structural integrity after cycling. Instead of using pure lithium as the counter electrode in half-cell configuration, practical LIBs normally use lithium transition metal oxides as cathodes which have limited lithium ions within the cell. Anodes with very high surface areas, especially Si-based anodes, are not desirable because of their relatively high irreversible capacity loss, due to the formation and buildup of the solid electrolyte interface (SEI) layer. To remedy this problem, in this work, we propose to modify the porous MPSSs with carbon to form a monodisperse silicon and carbon nanocomposite sphere structure via a simple and scalable CVD process. The CVD carbon modification is achieved via cracking of C$_2$H$_2$ under ambient pressure at 900° C. Transmission electron microscopy (TEM) image shows the MPSSs were successfully coated with carbon after CVD process and the mesopores within the MPSS structure were filled with graphitic carbon materials (FIG. 1d, for details, see FIG. 7). High-resolution TEM images are shown to further characterize the carbon and silicon interface and the uniformity of the carbon layer. High-resolution transmission electron microscopy (HR-TEM) image together with the corresponding FFT suggests the silicon within the MSNSs are crystalline with clear lattice fringes corresponding to Si (111), which shows a d spacing of 0.31 nm (FIG. 1e, FIG. 6a). The d-spacing of carbon (0.35 nm) and polycrystalline silicon (0.31 nm) is too close, to better distinguish the carbon and silicon interface and confirm the thickness of the carbon coating layer, HRTEM and corresponding inverted FFT images are collected (FIG. 6a-b). The Fourier masked micrographs of FIG. 6a reveals the carbon layer is uniformly coated with a thickness around 4-5 nm which corresponds to 10 carbon layers (FIG. 1f and FIG. 6c-d).

Figure 2A:
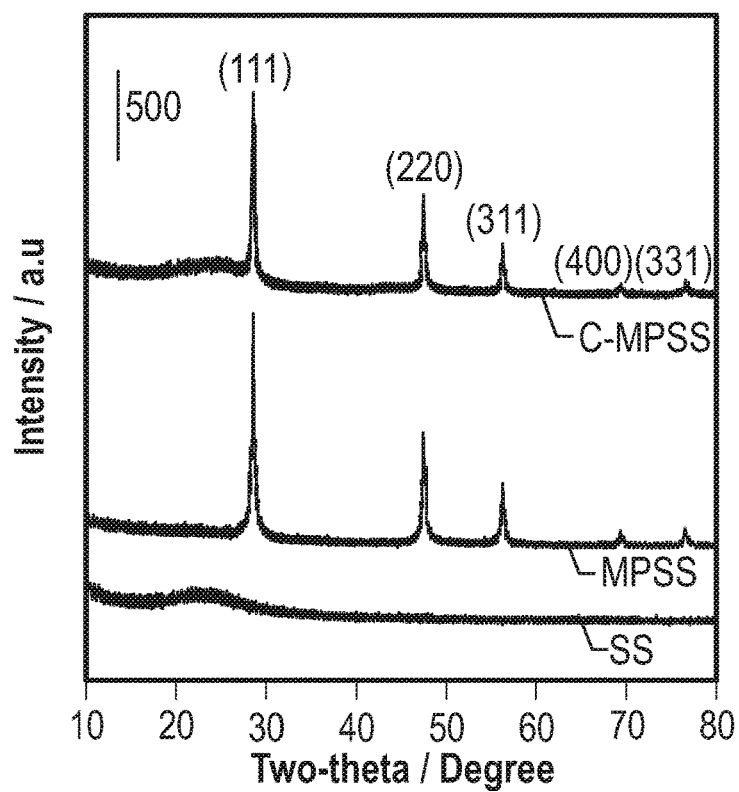
FIGS. 2A-2D show materials characterization data of particles according to an example of the invention.
Figure 2B:
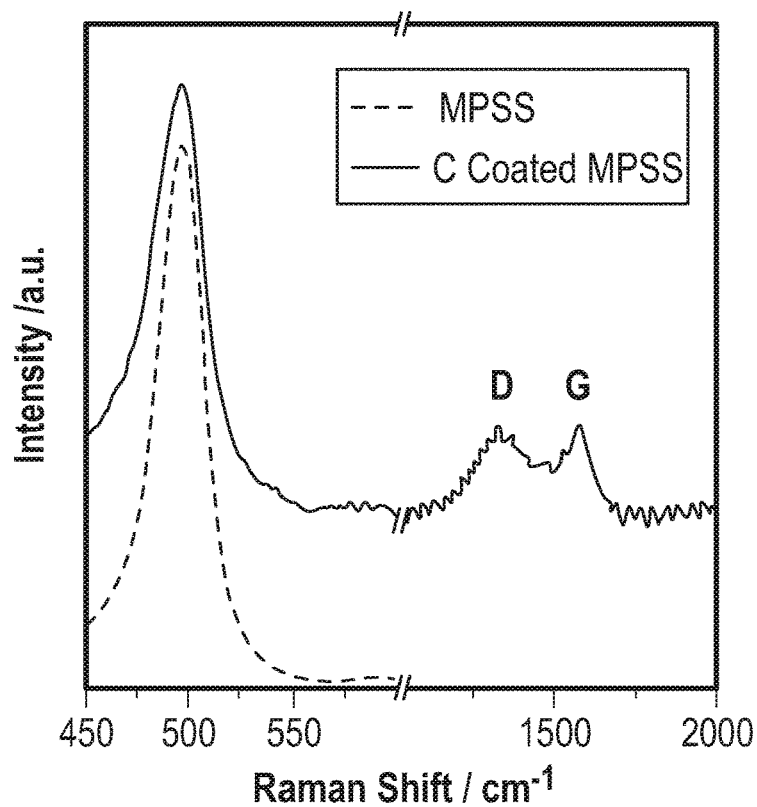
Figure 2C:
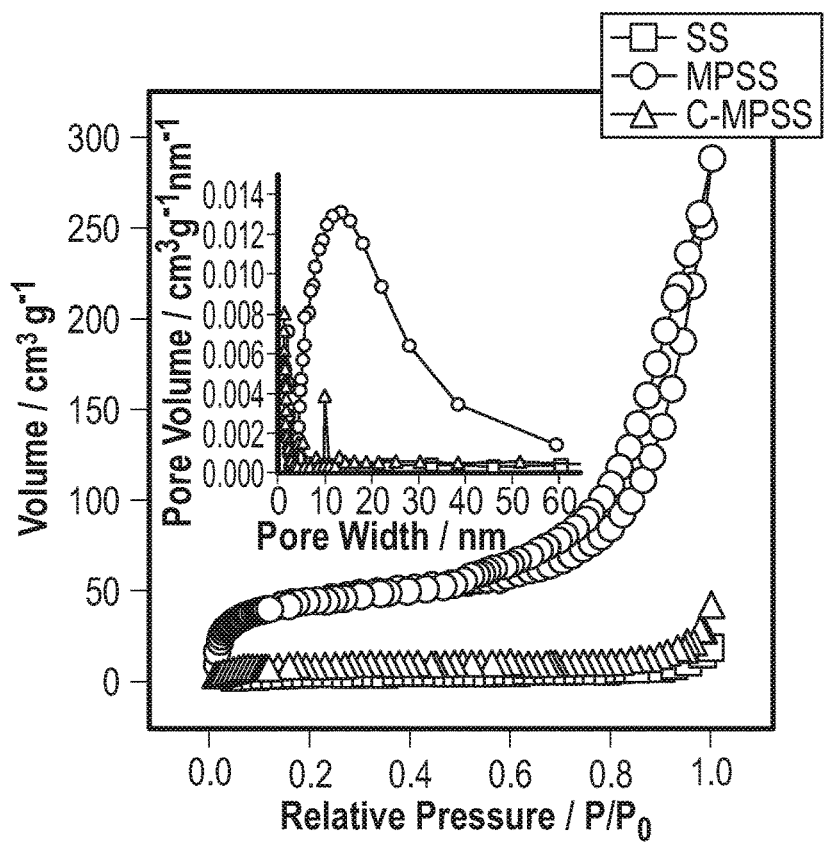
Figure 2D:
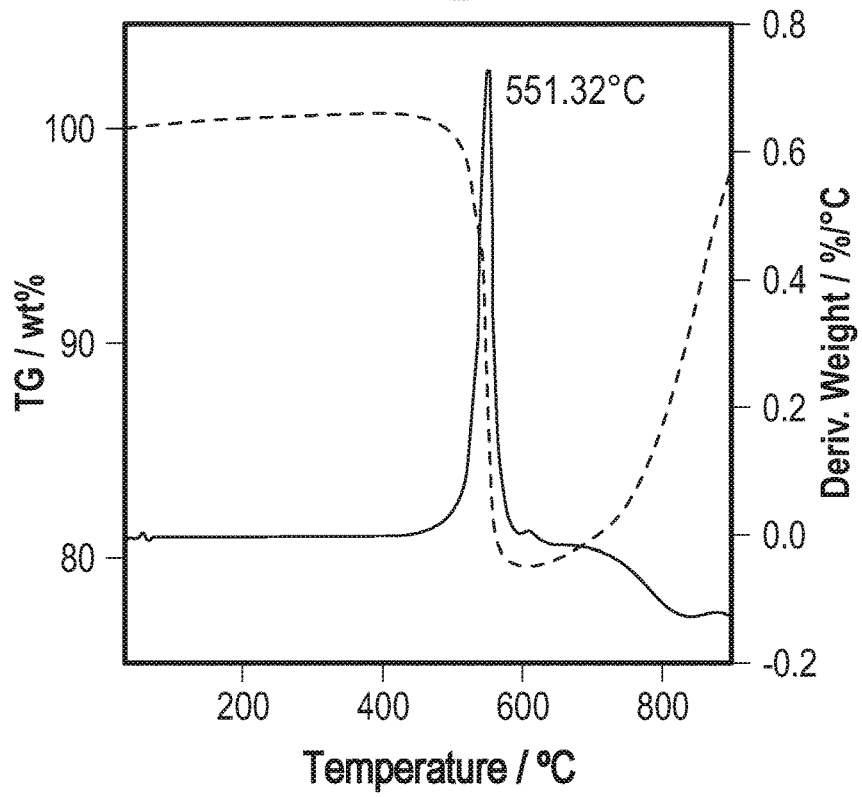

Powder X-ray diffraction (XRD) was conducted to characterize the crystallinity and purity of the starting material SSs and as-synthesized MPSSs and MSNSs, (FIG. 2a). The black XRD pattern is consistent with typical amorphous phase structure of silica materials. The red and blue XRD patterns can be indexed as polycrystalline silicon while the spectra of MSNSs (blue) also shows one broad peak around 25 degree, which can be due to the existence of graphitic carbon in the MSNSs. The narrow and sharp XRD peaks absence of obvious amorphous scattering background exhibited by MPSSs and MSNSs suggest a high degree of crystallinity, and they can be indexed to a cubic phase of silicon. To further examine the as obtained MPSSs and MSNSs material, Raman spectroscopy was performed (FIG. 2b). The sharp peaks at a shift of 521 cm$^{-1}$ for both MPSS and MSNS are in good agreement with the Raman spectra of polycrystalline silicon which is in accordance with the findings from XRD patterns shown in FIG. 2a. Besides the peak at a shift of 521 cm$^{-1}$, the MSNS shows an additional D peak centered around 1340 cm$^{-1}$ and the G peak centered around 1572 cm$^{-1}$, which further confirmed the carbon and silicon nanocomposite nature of the MSNSs. The presence of the intense D band in the spectrum is typically associated with disorder or defects in nanostructured carbonaceous materials, and the MSNS shows high $I_D/I_G$(~1) suggests that the MSNSs have high level of disorder. We believe disorders of carbon coating of MPSS can be beneficial in this work since it could offer better ion permeability and help to limit the outward expansion during electrochemical charge and discharge process. HRTEM images in FIG. 1b-c have evidently shown the SSs, MPSSs, and MSNSs have distinctly different porosity. Nitrogen adsorption isotherms are shown to confirm further the porosity and surface area evolution from solid to mesoporous and to solid for SS, MPSS, and MSNS, respectively. The MPSSs show a nearly 20 times enlargement in surface area (Langmuir: 353.22, Brunauer-Emmett-Teller (BET): 214.65 m$^2$g$^{-1}$) compare with SSs (Langmuir: 20.07, BET: 11.89 m$^2$g$^{-1}$) after Mg reduction as suggested by our former study (FIG. 2c).[21] It is interesting to note that the Langmuir and BET surface areas of MSNSs are reduced to 34.64 m$^2$ g$^{-1}$ and 20.94 m$^2$g$^{-1}$, respectively after CVD carbon coating process which suggests the final product has limited pores. The inset of FIG. 2c shows the pore distribution of SS, MPSS, and MSNS, which suggests MPSS possesses very high surface area due to a combination of mesopores and micropores while both SSs and MSNSs have limited surface area and porosity. Thermogravimetric analysis (TGA) shown in FIG. 2d indicates the silicon content in MSNSs is around 80% (FIG. 2d).

Figure 3A:
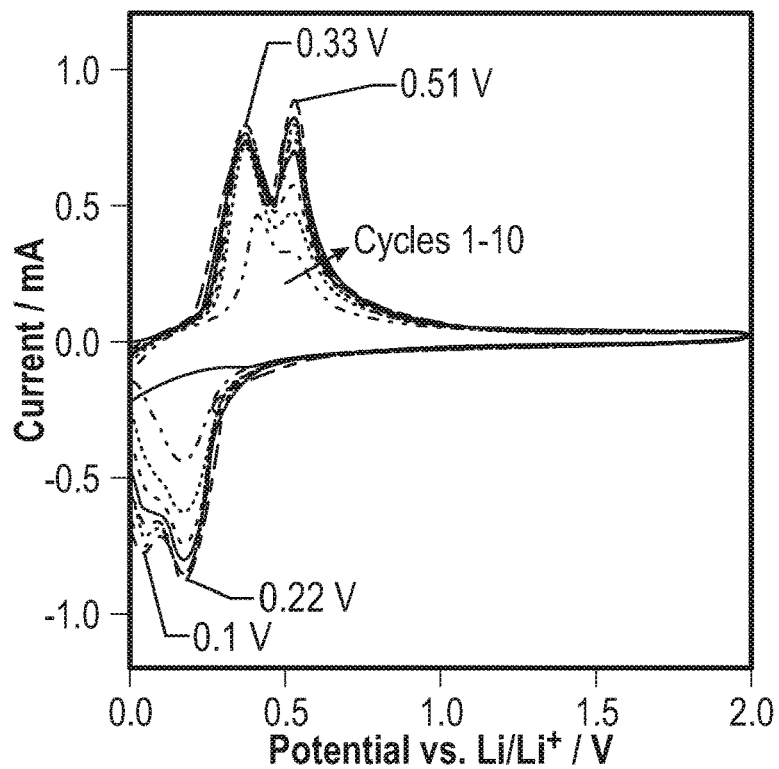
FIGS. 3A-3E show electrical test data of electrodes according to an example of the invention.
Figure 3B:
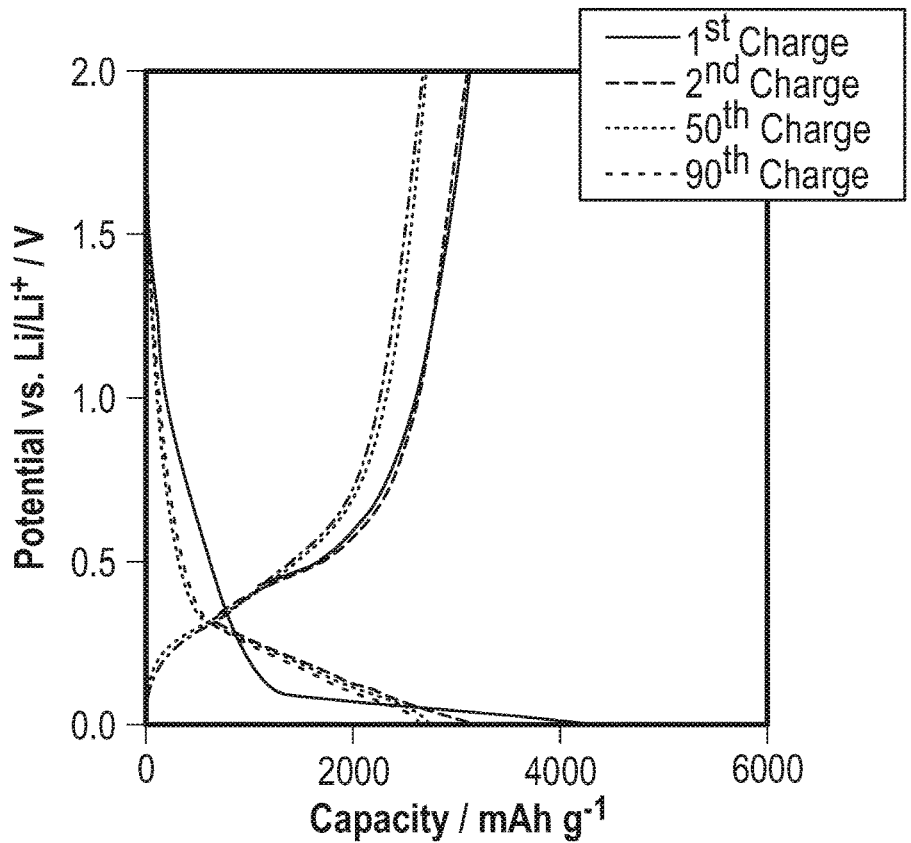
Figure 3C:
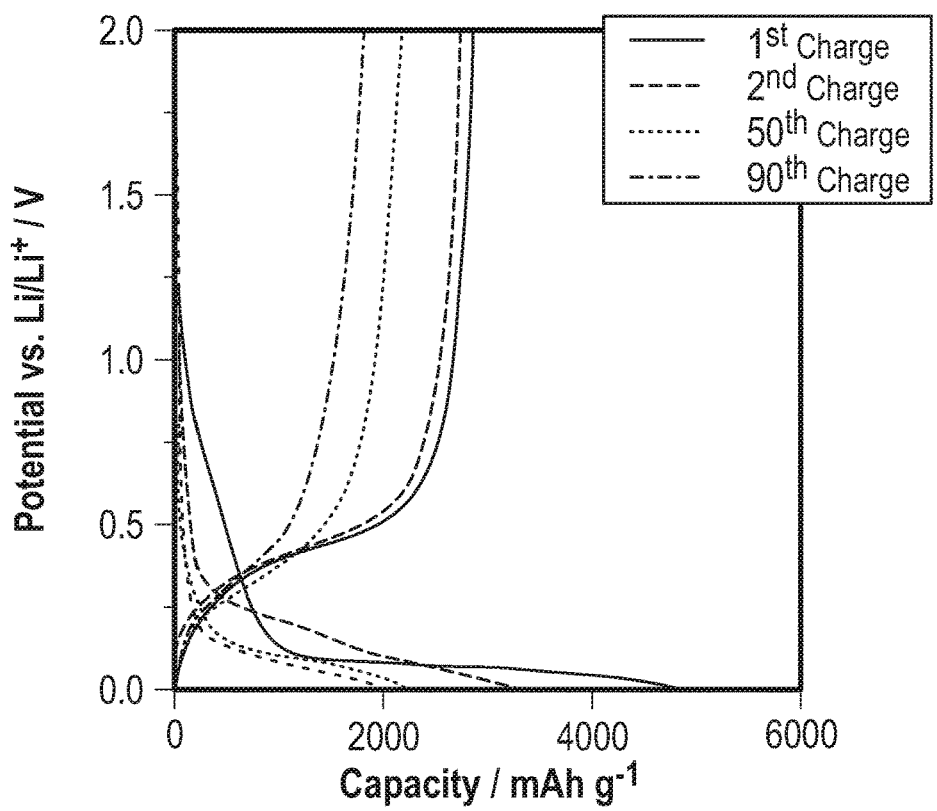
Figure 3D:
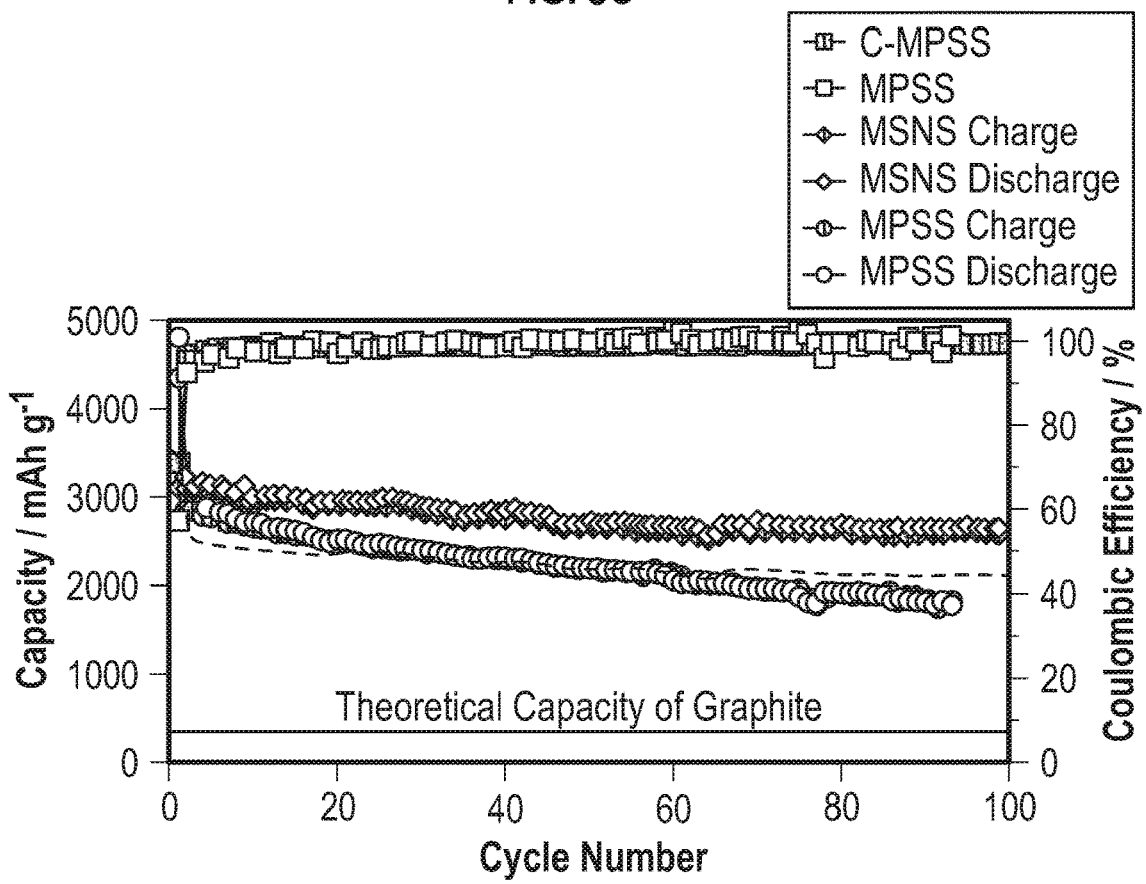
Figure 3E:
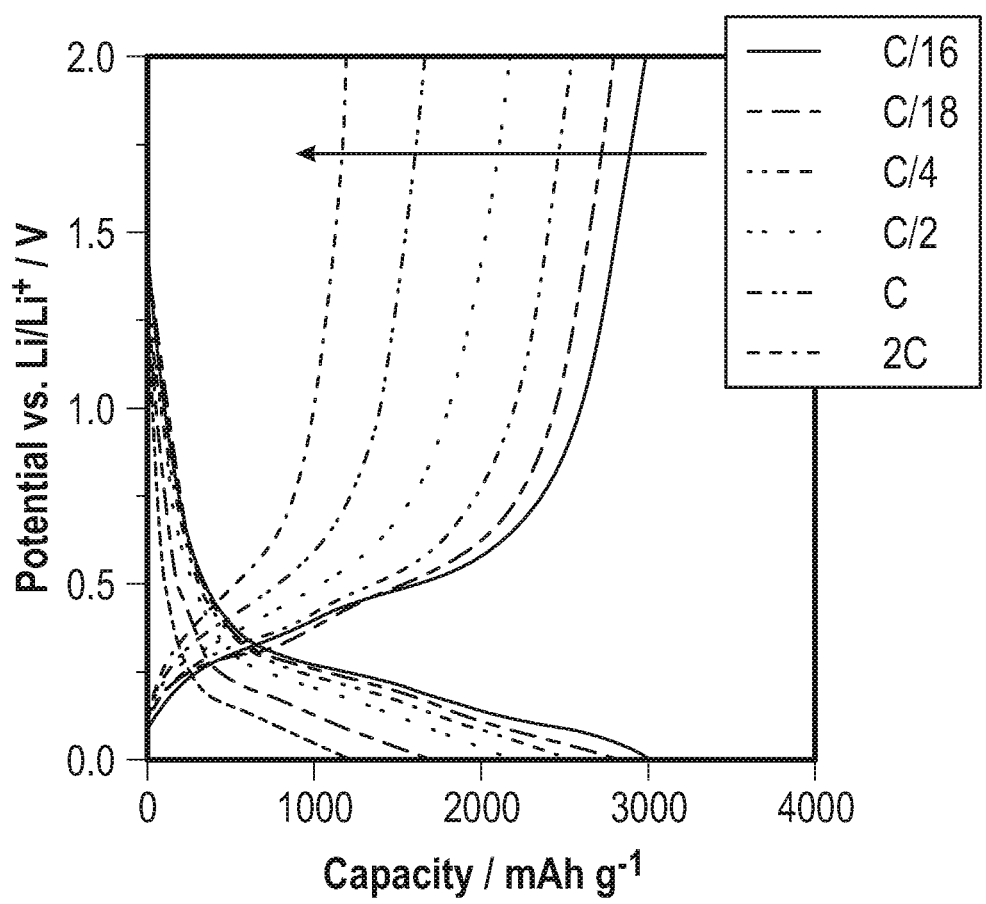
Figure 4A:
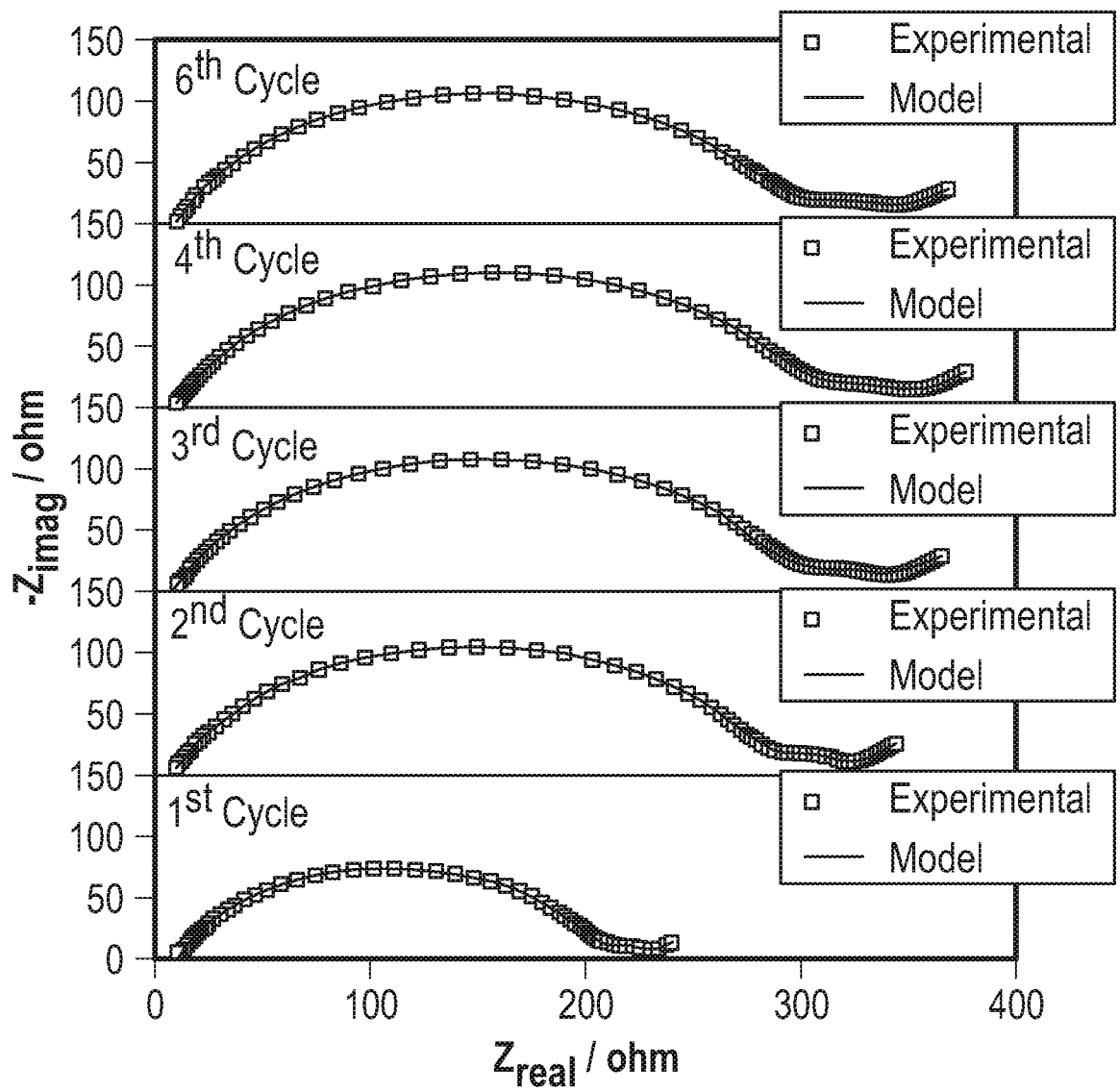
FIGS. 4A-4D show additional electrical test data of electrodes according to an example of the invention.
Figure 4B:
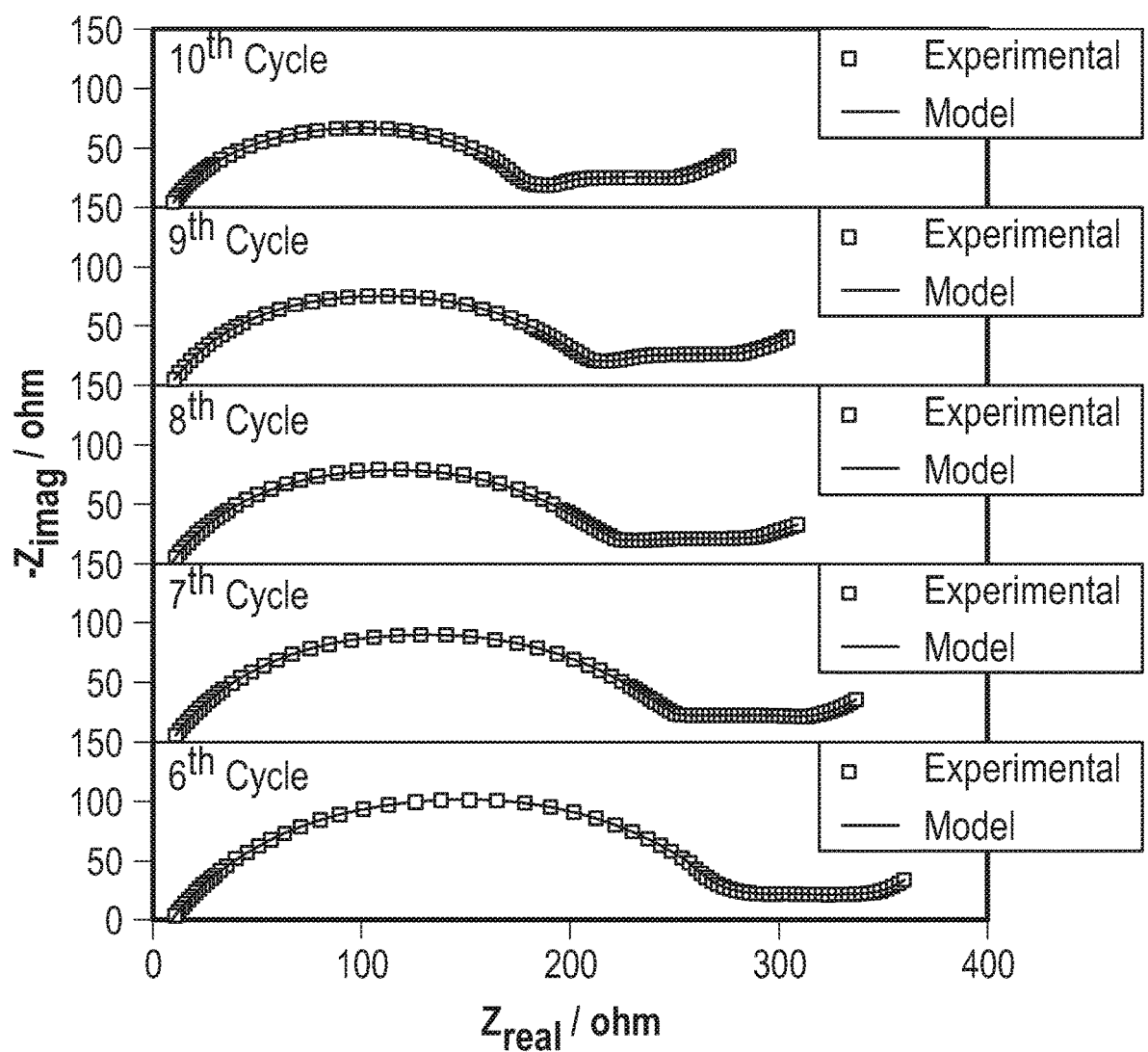
Figure 4C:
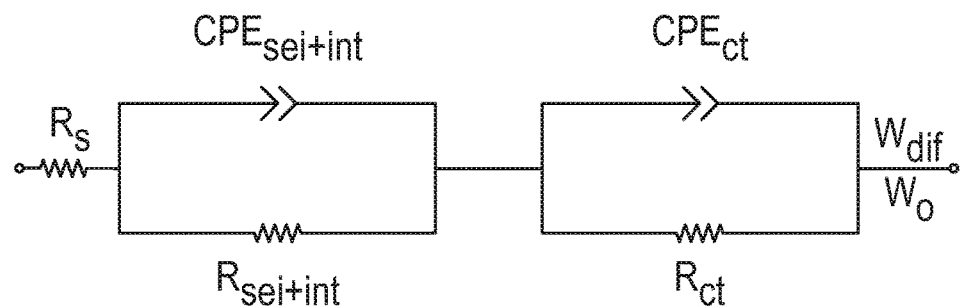
Figure 4D:
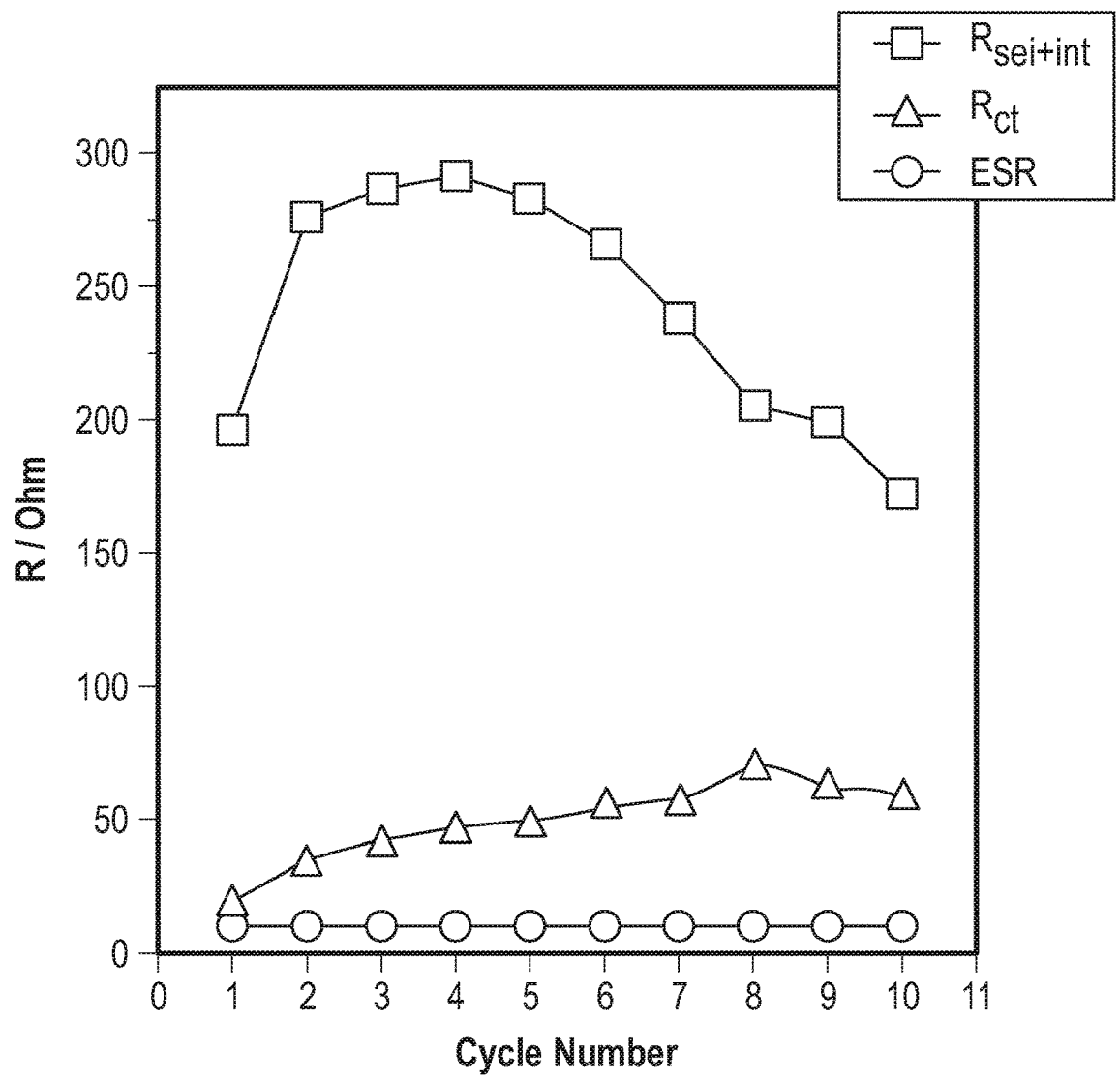

Coin half cells were built to evaluate the electrochemical performance of the MSNSs as anode active material. 2032-type coin half cells were built in an Ar-filled glove box with moisture and oxygen level below 0.5 ppm. MSNS electrode was used as the anode, and pure Li metal chip was as the counter electrode. The electrodes were prepared by mixing 90% active material (MSNS in this work) with 10% alginate binder, and the as-prepared anode slurry was cast on Cu foil FIG. 3a shows the cyclic voltammogram of the MSNS anode half cells at a scan rate of 0.2 mV sec$^{-1}$. It is promising to see no noticeable peaks observed during first charge process for above 0.5 V region which suggests a very low irreversible charge capacity in the first cycle. We believe this is due to much lower level of solid-electrolyte-interface (SEI) layer formation and buildup (0.5-0.7 V) for MSNS electrode compare with previously reported MPSS electrode.[21] The two broad lithiation peaks observed during charge process can be attributed to the electrochemically-driven solid-state alloying Li$_x$Si (if it is fully charged, x≈3.75), while the delithiation peaks during discharge process are from dealloying of amorphous lithium silicide (a-Li$_x$Si, x~3.75). After the formation and activation in the first three cycles, the current-potential characteristics become approximately consistent for the cycles afterward. The voltage profiles are observed to be in good agreement with the cyclic voltammognims. FIG. 3b shows the 1$^{st}$ charge, 2$^{nd}$, 50$^{th}$, and 90$^{th}$ cycle voltage profiles of MSNS based coin half cell. The cells were deep charged and discharged between 0.01 V and 2.0 V at a rate of C/20. Compare with our previously reported MPSS anode, a relatively higher reversible discharge capacity of 3207 mAh g$^{-1}$ is achieved by the MSNS cell (MPSS cell: 3105 mAh g$^{-1}$ at C/20) from the 2$^{nd}$ cycle (after the first charge). Besides higher reversible capacity, near consistent charge-discharge characteristics are observed for MSNS cell in subsequent cycles. (50$^{th}$ cycle: 2715 mAh g$^{-1}$, 90$^{th}$ cycle: 2645 mAh g$^{-1}$). The capacity faded relatively faster for MPSS anode during the subsequent cycles compared with MSNS anode (50$^{th}$ cycle: 2180 mAh g$^{-1}$, 90$^{th}$ cycle: 1823 mAh g$^{-1}$). In addition, the MSNS electrode demonstrates much lower irreversible capacity under deep charging and discharging in the first cycle (FIG. 3b-c). The C/20 cycling performance of MSNS and MPSS electrodes is demonstrated in FIG. 3d. An over 85% capacity retention is achieved by MSNS cell over 100 charge-discharge cycles at relatively low rate of C/which is much higher than the MPSS cell. Coulombic efficiency (CE) is a critical factor to judge the reversibility of the cell. After the SEI formation in the first cycle, the CE of MSNS anode half cells obtained for all cycles is around 100%, suggesting MSNS based anodes have excellent reversibility. The discharge irreversible capacity for the 1$^{st}$ charge is due to the formation of the SEI layer on the surface of electrodes.[5] For full cell LIBs, which normally use lithium transition metal oxide as a cathode, the initial coulombic efficiency is essential. It is evident that the MSNS demonstrates much higher initial coulombic efficiency (ICE) of 71.3% (vs. MPSS is 57.25%). The dashed line in FIG. 4d shows the capacity retention vs. cycling based on the total weight of silicon and carbon in the MSNS structure which is around 80% of the capacities calculated based on silicon only. FIG. 4d suggests even taking the weight of conductive additive into account; the MSNS system still demonstrates a comparable reversible capacity and superior cycling stability. The rate capability of the MSNS anode was evaluated via using galvanostatic cycling under various rates of C/16, C/8, C/4, C/2, C, and 2 C (FIG. 3e). It is evident that even under high rate around 2 C (30 min charge) the anode capacity is still maintained above 1200 mAh which is almost three times higher than conventional graphite-based anodes.

To better understand the charge transfer and ion transfer mechanism of the MSNS anodes, electrochemical impedance spectroscopy (EIS) measurements were conducted for ten consecutive cycles for MSNS based anode half cells under the fully charged state. The experimental and fitted EIS plots are summarized in FIGS. 4a and 4b which all consist of two semicircles and one near linear diffusion drift. The equivalent circuit used for fitting for our MSNS-based electrode system is shown in FIG. 4c. The fitted impedance parameters including equivalent series resistance (ESR), interfacial resistance (R$_{sei+int}$), and the charge transfer resistance (R$_{ct}$) at different cycles are summarized in FIG. 4d. Equivalent series resistance (ESR) commonly referred to the high-frequency intercept is relates to the electronic conductivity of the electrodes, contact resistances associated with cell components, as well as the ionic conductivity of the electrolyte solution.[38,39] The MSNS anode half cell exhibits low and stable ESR values around 10 ohms with a small range of fluctuations (±1 ohm) in the first ten cycles. The high-frequency depressed semicircle in this work corresponds to The interfacial impedance due to the formation of solid electrolyte interface (SEI) layer and interface electronic contacts between the current collector and active material (R$_{sei+int}$) corresponds to the high frequency depressed semicircle (100 kHz to 200 mHz). The R$_{sei+int}$ for MSNS based LIB system increases in the first few cycles, and it tends to stabilize and then gradually decrease afterward. The $R_{sei+int}$ increase in the first few cycles can be attributed to the formation and buildup of SEI layer. In coin cell configuration, the electrodes are pressed by a spring, the decrease of $R_{sei+int}$ may be due to the irreversible electrode volume change during cycling which results in a gradual increase of the clamping pressure on the electrodes. Therefore, the $R_{sei+int}$ was slightly improved. The charge-transfer resistance ($R_{ct}$) is associated with the medium-frequency depressed semicircle The $R_{ct}$ values for MSNS anode half cells constantly increase over the first few cycles and tend to stabilize at around 50 ohms after 8-10 cycles. The charge transfer reaction predominantly happens on the surface of the active material, in this work, the electronic contact between carbon and silicon within the MSNS nanocomposite system has a great impact on the charge transfer reaction. The carbon coating provides an interpenetrating conductive network within the MSNS nanocomposite system which facilitates charge transfer and minimizes the loss of the electronic contact between MSNS and polymer binder. The Warburg impedance ($W_O$) describes diffusion-related phenomena in both electrolyte and bulk electrode which is associated with the low-frequency tail (<200 mHz). The shorter tails in the EIS plots for the MSNS anode half cells (FIG. 4a-b) implies faster and more facile diffusion of $Li^+$ in the cell.

Figure 5A:
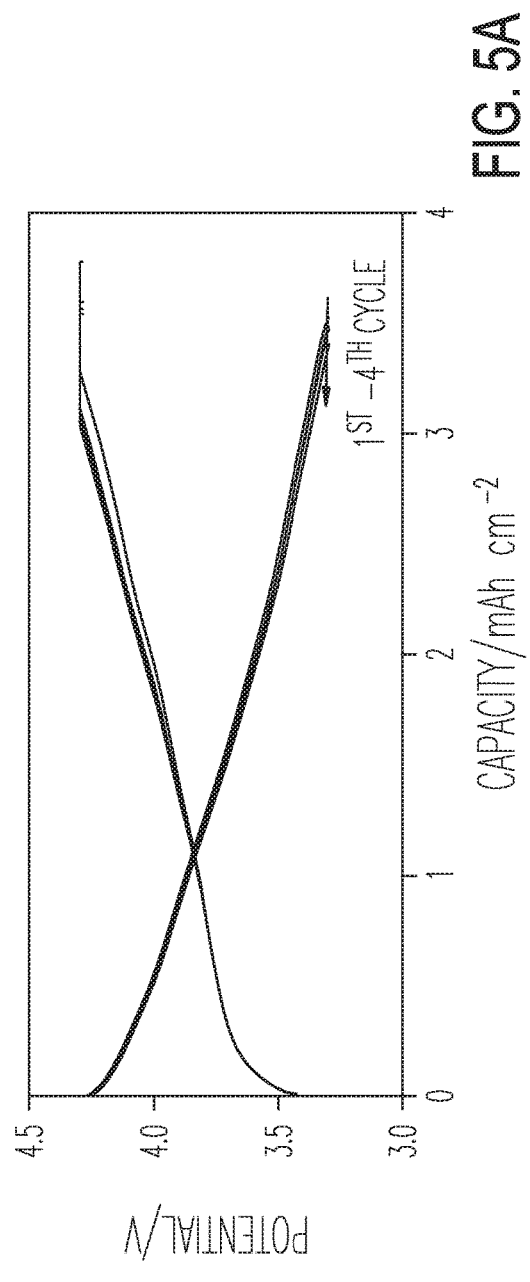
FIGS. 5A-5B show additional electrical test data of electrodes according to an example of the invention.
Figure 5B:
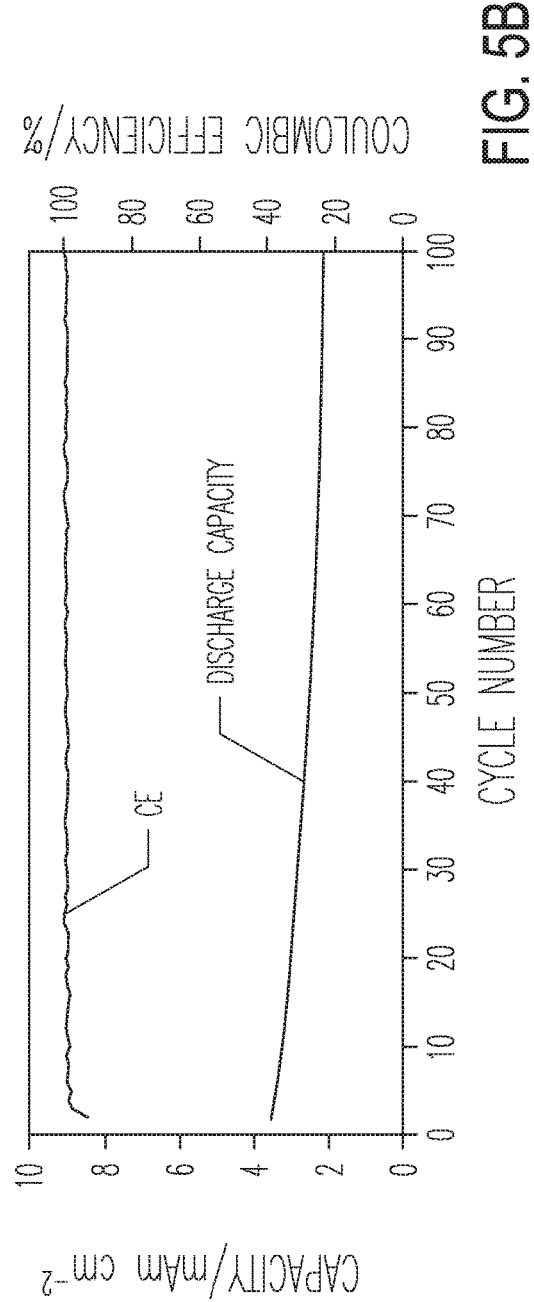

Finally, a full cell LIB is demonstrated by employing MSNS anode and $LiCoO_2$ (LCO) cathode. The cell balance value (capacity ratio of the negative and positive electrode) is selected to be slightly larger than 1 to ensure the cell is cathode limited. The electrochemical performance of the MSNS/LCO full cell is studied by the galvanostatic charge and discharge cycles with an operational voltage window from 4.3 to 3.3 V. The MSNS/LCO full cell is activated for 1 cycle at the rate of C/20 (based on the cathode capacity) and then the cell is cycled at C/2 for 100 cycles. FIG. 5a shows galvanostatic voltage profiles for the $1^{st}$ to $4^{th}$ cycle. The reversible discharge capacity is measured to be 3.52 mAh $cm^{-2}$ in the 1st cycle and the reversible capacity is maintained above 2.2 mAh $cm^{-2}$ for the subsequent cycles with a coulombic efficiency (CE) of >99.9% (FIG. 5b). The energy density of the MSNS/LCO full cell is measured to be on the order of 850 Wh/L with the consideration of both cathode and anode, and we anticipate this value can be further increased by optimizing the electrode structure and cell balancing.

In conclusion, synthesis of monodisperse Si and C nanocomposite spheres via a facile magnesiothertnic reduction with subsequent CVD process has been demonstrated. We believe the monodisperse and high symmetrical nature of the composite spheres allow a homogeneous stress-strain distribution within the structure during charge and discharge. Anode half cells based on MSNSs demonstrate a higher reversible capacity of 3207 mAh $g^{-1}$, enhanced cycling stability, improved ICE and rate performance compare with previously reported MPSS anode system. The MSNS/LCO full cell design shows a high volumetric energy density of 850 Wh/L and excellent cycling stability. We believe optimization and further development of this MSNS anode design will lead to new opportunities for high energy density energy LIBs.

Synthesis of MSNS. Monodispersed solid silica nanospheres (SS) and monodisperse porous silicon nanospheres (MPSSs) are prepared via the modified Stober method and previously reported surface protected magnesiothennic reduction, respectively. SS powder is milled with NaCl in a 1:10 w/wand then the SS/NaCl mixture is immersed in deionized water under ultrasonication and stirring for 1 hour. Well mixed SS/NaCl powder is achieved by removing water by drying. Then the SS/NaCl powder is mixed with Mg powder (99.5%, −325 mesh, Sigma-Aldrich) in a 1:0.9 w/w SS:Mg ratio. Next, the SS/NaCl/Mg mixture is heated to 700° C. at a ramping rate of 5° C./min, held at 700 C. for 6 hours, and cooled to room temperature in the inert environment. The NaCl is removed from resulting product by washing with water several times. Unwanted $Mg_2Si$ and MgO are removed via etching in concentrated HCl overnight with subsequent washing with DI $H_2O$. Unreacted $SiO_2$ is removed by HF etching. The rinsed powder is dispersed in ethanol and ultimately dried under vacuum for 4 hours at 100° C. To achieve MSNSs, the resulting MPSSs are heated in a hot-wall CVD furnace to 900° C. under ambient pressure in an $Ar/H_2$ atmosphere, and once the temperature reaches 900° C., acetylene ($C_2H_2$) is introduced to trigger and continue the growth of carbon layer.

The surface morphology of SS, MPSS and MSNS is examined using scanning electron microscopy (SEM leosupra, 1550) and transmission electron microscopy (TEM; Philips, CM300) with a $LaB_6$ cathode operated at 300 KV, The crystal structure is analyzed with a PANalytical Empyrean X-Ray Diffractometer (XRD). The Raman spectra of SS, MPSS and MSNS, are collected with a Renishaw DXR Raman spectroscopy system with a 532 nm laser (8 mW excitation power, 100× objective lens). The BET surface area and pore distribution are measured by a Quantachrome BET analyzer.

The MPSS electrodes were prepared by casting a slurry containing 70% active material 20% conductive additive (carbon black), and 10% sodium alginate binder. The MSNS contains about 20% carbon, so the powder itself is considered conductive, the MSNS electrodes are prepared by casting a slurry containing 90% active material (MSNS) with 10 wt % sodium alginate binder without any conductive additive. The per area mass loading was 1-5 mg $cm^{-2}$ CR 2032 coin cell configuration is used for the electrochemical measurements. The cells are assembled in an Ar-filled glove box. Pure Li metal chip is used as the counter electrode for coin half cells. Commercial $LiCoO_2$ cathodes (provided by Temiz Energy Technologies) are utilized for the fabrication of coin full cell. Celgard 3501 porous membrane is used as the separator. The electrolyte employed in this work is 1 M $LiPF_6$ dissolved in a 1:1 (by volume) mixture of ethylene carbonate (EC) and dimethyl carbonate (DMC). Cyclic voltammetry scans were conducted at a scan rate of 0.2 mV $sec^{-1}$ with an operational voltage window of 0.01 to 2.0 V (vs. potential of $Li^+/Li$). Galvanostatic charge-discharge and cycling performance measurements are conducted at a fixed operational voltage window between 0.01 V and 2.0 V for anode half cells. The MSNS/LCO full cells are measured with a fixed cell voltage between 3.3 V and 4.3 V. Potentiostatic electrochemical impedance spectroscopy (EIS) analysis was conducted between 0.01 Hz and 1 MHz with an amplitude of 10 mV under 100% state of charge (SOC).

Figure 9:
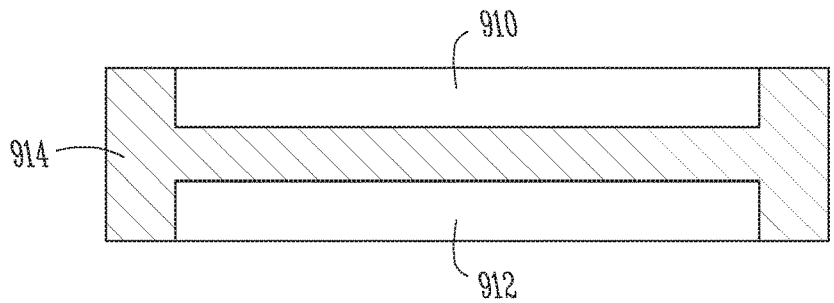
FIG. 9 shows a battery according to an example of the invention.

FIG. 9 shows an example of a battery 900 according to an embodiment of the invention. The battery 900 is shown including an anode 910 and a cathode 912. An electrolyte 914 is shown between the anode 910 and the cathode 912. In one example, the battery 900 is a lithium-ion battery. In one example, the anode 910 is formed from monodisperse silicon and carbon nanocomposite spheres (MSNSs) as described in examples above. In one example, although the invention is not so limited, the battery 900 is formed to comply with a 2032 coin type form factor.

Figure 10:
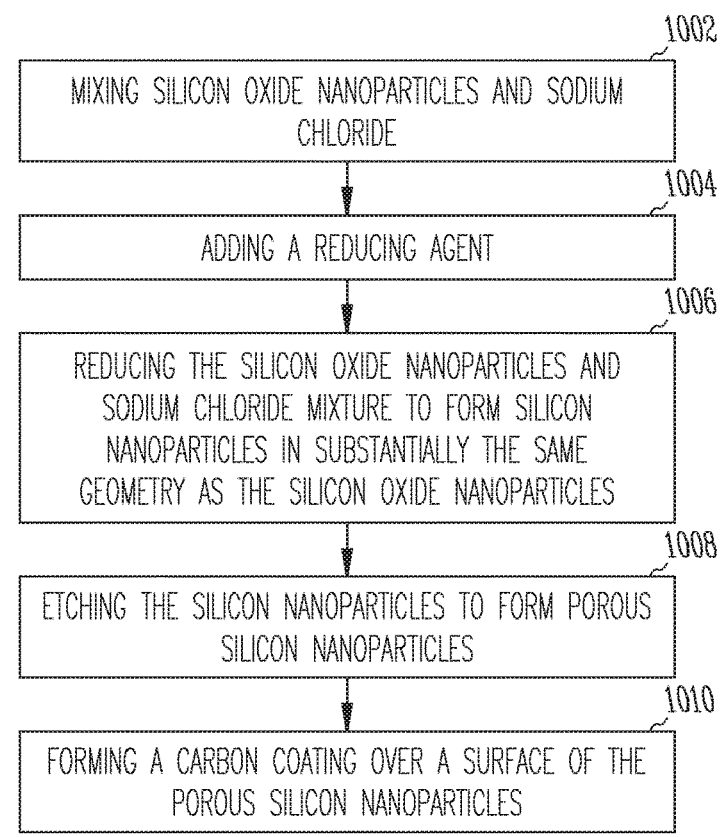
FIG. 10 shows a method of forming a material according to an example of the invention.

FIG. 10 shows an example method of forming an electrode according to an embodiment of the invention. In operation 1002, silicon oxide nanoparticles and sodium chloride are mixed. In operation 1004 a reducing agent is added. In operation 1006, the silicon oxide nanoparticles and sodium chloride mixture are reduced to form silicon nanoparticles in substantially the same geometry as the silicon oxide nanoparticles. In operation 1008, the silicon nanoparticles are etched to form porous silicon nanoparticles. In operation 1010, a carbon coating is formed over a surface of the porous silicon nanoparticles.

To better illustrate the method and device disclosed herein, a non-limiting list of embodiments is provided here:

Example 1 includes a battery. The battery includes a first electrode, including a number of porous silicon spheres, a carbon coating covering a surface portion of the porous silicon spheres. The battery includes a second electrode, and an electrolyte in contact with both the first electrode and the second electrode.

Example 2 includes the battery of example 1, wherein the porous silicon spheres are between approximately 0.05 micrometer and 2.00 micrometer in diameter.

Example 3 includes the battery of any one of examples 1-2, wherein the porous silicon spheres are approximately 0.2 micrometer in diameter.

Example 4 includes the battery of any one of examples 1-3, wherein the porous silicon spheres include pores with pore diameters between 10 and 30 nanometers.

Example 5 includes the battery of any one of examples 1-4, wherein the carbon coating includes graphite.

Example 6 includes the battery of any one of examples 1-5, wherein the carbon coating includes graphite with a substantially disordered microstructure.

Example 7 includes the battery of any one of examples 1-6, wherein the carbon coating has a thickness of between 4 and 5 nanometers.

Example 8 includes the battery of any one of examples 1-7, wherein the number of porous silicon spheres includes substantially crystalline porous silicon spheres.

Example 9 includes the battery of any one of examples 1-8, wherein the second electrode includes lithium metal.

Example 10 includes the battery of any one of examples 1-9, wherein the number of porous silicon spheres include a surface area of between 20 $m^2g^{-1}$ and 40 $m^2g^{-1}$ with the carbon coating covering a surface portion of the porous silicon spheres.

Example 11 includes a method of forming a battery electrode, comprising mixing silicon oxide spheres and sodium chloride, adding a reducing agent, reducing the silicon oxide spheres and sodium chloride mixture to form silicon spheres, etching the reduced silicon spheres to form a porous silicon sphere, and forming a carbon coating over a surface of the porous silicon sphere.

Example 12 includes the method of example 11, wherein reducing the silicon oxide spheres and sodium chloride mixture includes magnesiothermically reducing the silicon oxide spheres and sodium chloride mixture.

Example 13 includes the method of any one of examples 10-12, wherein mixing silicon oxide spheres and sodium chloride includes mixing silicon oxide spheres and sodium chloride in a ratio of approximately 1:10 silicon oxide to sodium chloride by weight.

Example 14 includes the method of any one of examples 10-13, further including mixing magnesium powder with the silicon oxide spheres and sodium chloride in a ratio of approximately 1:0.9 silicon oxide to magnesium by weight.

Example 15 includes the method of any one of examples 10-14, wherein forming, the carbon coating over the surface of the porous silicon sphere includes CVD coating of carbon over the surface of the porous silicon sphere.

Example 16 includes the method of any one of examples 10-15, wherein forming the carbon coating over the surface of the porous silicon sphere includes converting $C_2H_2$ at elevated temperature into a carbon coating.

Example 17 includes the method of any one of examples 10-16, wherein forming the carbon coating over the surface of the porous silicon sphere includes heating to about 900 degrees Celsius in an inert gas atmosphere along with the $C_2H_2$.

Example 18 includes a method of forming a battery electrode, comprising mixing silicon oxide nanoparticles and sodium chloride, adding a reducing agent, reducing the silicon oxide nanoparticles and sodium chloride mixture to form silicon nanoparticles in substantially the same geometry as the silicon oxide nanoparticles, etching the silicon nanoparticles to form porous silicon nanoparticles, and forming a carbon coating over a surface of the porous silicon nanoparticles.

Example 19 includes the method of example 18, wherein mixing silicon oxide nanoparticles includes mixing silicon oxide nanospheres.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A battery, comprising:
a first electrode, including:
a number of porous silicon spheres;
a carbon coating covering a surface portion of the porous silicon spheres;
a second electrode; and
an electrolyte in contact with both the first electrode and the second electrode,
wherein the number of porous silicon spheres include a surface area of between 20 $m^2g^{-1}$ and 40 $m^2g^{-1}$ with the carbon coating covering a surface portion of the porous silicon spheres.

2. The battery of claim 1, wherein the porous silicon spheres are between approximately 0.05 micrometer and 2.00 micrometer in diameter.

3. The battery of claim 1, wherein the porous silicon spheres are approximately 0.2 micrometer in diameter.

4. The battery of claim 1, wherein the porous silicon spheres include pores with pore diameters between 10 and 30 nanometers.

5. The battery of claim 1, wherein the carbon coating includes graphite.

6. The battery of claim 1, wherein the carbon coating includes graphite with a substantially disordered microstructure.

7. The battery of claim 1, wherein the carbon coating has a thickness of between 4 and 5 nanometers.

8. The battery of claim 1, wherein the number of porous silicon spheres includes substantially crystalline porous silicon spheres.

9. The battery of claim 1, wherein the second electrode includes lithium metal.

* * * * *